United States Patent
Kim et al.

(10) Patent No.: US 7,376,263 B2
(45) Date of Patent: May 20, 2008

(54) CONTENT-BASED MULTIMEDIA RETRIEVAL SYSTEM AND METHOD THEREOF

(75) Inventors: Hyeon Jun Kim, Seongnam (KR); Ji Eun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1441 days.

(21) Appl. No.: 09/785,443

(22) Filed: Feb. 20, 2001

(65) Prior Publication Data

US 2001/0017940 A1    Aug. 30, 2001

(30) Foreign Application Priority Data

Feb. 18, 2000 (KR) ................................. 2000-7708
Mar. 7, 2000 (KR) ............................... 2000-11336

(51) Int. Cl.
*G06K 9/00* (2006.01)
(52) U.S. Cl. ...................................... 382/162; 382/305
(58) Field of Classification Search ........ 382/162–171, 382/305; 707/104.1, 1–7; 345/589–604; 358/403–404, 518–522
See application file for complete search history.

(56) References Cited

U.S. PATENT DOCUMENTS

| | | | |
|---|---|---|---|
| 6,163,622 A * | 12/2000 | Abdel-Mottaleb et al. | 382/305 |
| 6,285,995 B1 * | 9/2001 | Abdel-Mottaleb et al. | 707/3 |
| 6,411,724 B1 * | 6/2002 | Vaithilingam et al. | 707/104.1 |
| 6,512,850 B2 * | 1/2003 | Yaung | 382/225 |
| 6,564,263 B1 * | 5/2003 | Bergman et al. | 707/104.1 |
| 6,621,926 B1 * | 9/2003 | Yoon et al. | 382/305 |

FOREIGN PATENT DOCUMENTS

| | | |
|---|---|---|
| JP | 09-149257 | 6/1997 |
| JP | 2000-011138 | 1/2000 |

OTHER PUBLICATIONS

Li et al. "Multimedia content description in the infopyramid" IEEE Proc. Int. Conf. Acoust, Speech, Signal Processing, 1998, pp. 3789-3792, May 1998.*
European Search Report dated Mar. 18, 2005.
Smith, J.R. et al., "Tools and Techniques for Color Image Retrieval;" Storage and Retrieval for Still Image and Video Databases 4, San Jose, CA, Proceedings of SPIE; vol. 2670, Feb. 1, 1996; pp. 426-437.
Donjerkovic, D. et al.; "Dynamic Histograms: Capturing Evolving Data Sets;" University of Wisconsin-Madison Technical Report CS-TR-99-1396, Online! Mar. 1999; pp. 1-20.

(Continued)

*Primary Examiner*—Ishrat Sherali
(74) *Attorney, Agent, or Firm*—Ked & Associates, LLP

(57) ABSTRACT

The present invention relates to a multimedia retrieval system and a method thereof which is capable of performing a multimedia data retrieval among different systems using color histograms constructed with different color spaces and color quantization methods, in particular to a content-based multimedia retrieval system and a method thereof which is capable of retrieving multimedia data among different systems, by extracting or converting a color histogram of a query image or a color histogram of an image to be retrieved into a color histogram of the same color space and color quantization method each other, and using the extracted or converted color histogram.

22 Claims, 12 Drawing Sheets

OTHER PUBLICATIONS

Park, Du-Sik et al.; "Image Indexing Using Weighted Color Histogram;" International Conference on Image Analysis and Processing, Venice, Italy; Sep. 27, 1999; pp. 909-914.

Chung-Sheng Li et al.; "Multimedia Content Description in the Infopyramid;" 1998 IEEE; pp. 3789-3792.

Seungyup Pack et al.; "Self-Describing Schemes for Interoperable MPEG-7 Multimedia Content Descriptions;" Part of the IS&T/SPIE Conference on Visual Communications and Image Processing '99, San Jose, CA, Jan. 1999; SPIE vol. 3653, pp. 1518-1530.

Shih-Fu Chang et al.; "Visual Information Retrieval from Large Distributed Online Repositories;" Communications of the ACH, Dec. 1997/vol. 40, No. 12. pp. 63-71.

* cited by examiner

CONTENT-BASED MULTIMEDIA RETRIEVAL SYSTEM AND METHOD THEREOF

BACKGROUND OF THE INVENTION

1. Field of the Invention

The present invention relates to a system for retrieving multimedia data and a method thereof, in particular to a content-based multimedia retrieval system and a method thereof which is capable of retrieving multimedia data among different systems using color histograms constructed with different color spaces and color quantization methods.

2. Description of the Prior Art

In retrieval of content-based multimedia data in the conventional technology, color distribution of an image is displayed as a color histogram, the color histogram is defined in accordance with a color space and a color quantization method.

In addition, in retrieval of content-based multimedia data in the conventional technology, the color histogram is mainly used.

In other words, it is possible to perform an image or a video retrieval based on colors among systems using color histograms constructed with same color spaces and quantization methods on the internet circumstances. On the contrary, it is impossible to perform the image or video retrieval among systems using color histograms constructed with different color spaces and different quantization methods each other.

Herein, the color histogram displays the color distribution of the image, is easy to calculate similarity for comparing the color histograms, has a character unconcerned in position of a color pixel (Sometimes, a character concerned in position of a color pixel is needed in an image retrieval. For that, other feature display is used.), and has a better performance than the other color display method (texture histogram) for content-based image retrieval.

The content-based multimedia retrieval system using the color histogram will now be described with reference to accompanying FIG. 1.

FIG. 1 is a block diagram illustrating the construction of the content-based multimedia retrieval system using color histograms in accordance with the conventional technology.

As depicted in FIG. 1, the content-based multimedia retrieval system using the color histogram comprises a color quantizer 100 for being inputted query image inputted by a user and extracting a color histogram as feature information of the query image, an image database 103 for storing a plurality of retrieval object image data 103-1~103-N, a feature database 102 for storing the color histograms 102-1~102-N as the feature information of the plurality of retrieval object images, and a retrieval unit 101 for calculating similarity between the color histogram of the query image and the color histograms of the plurality of retrieval object images and outputting an image in accordance with the similarity as a retrieval result.

The operation of the content-based multimedia retrieval system using the color histogram in accordance with the conventional technology will now be described.

First, the color quantizer 100 extracts the color histograms 102-1~102-N in order to find the feature information of the image data 103-1~103-N about the plurality of retrieval object images. In other words, the color quantizer 100 extracts one color histogram 102-1 per each image 103-1.

The extracted color histograms 102-1~102-N are connected to the pertinent images 103-1~103-N, and are stored on the feature database 102. In other words, the extracted color histograms 102-1~102-N stored on the feature database 102 display the color distribution of the each image.

In addition, when the query image is inputted by the user, the color quantizer 100 extracts the color histogram about the query image.

In other words, the color quantizer 100 quantizes the designated color space into a plurality of subordinate spaces in accordance with the designated color space and quantization method.

Herein, the each quantized subordinate space is matched to one bin, color values of all pixels in a certain image constructs a color histogram in proportion to a frequency of occurrence corresponding to the each subordinate space.

The retrieval unit 101 calculates the similarity of the color histograms 102-1~102-N displaying the color histogram of the extracted query image and the color distribution of the retrieval object images 103~103-N stored in the feature database 102, and outputs the retrieval result in accordance with the similarity.

For example, the retrieval unit 101 calculates the similarity of the histograms 102-1~102-N extracted in advance for the image retrieval based on the color and stored in the feature database 102 and the histogram of the query image by using a known method, namely, a histogram matching method such as a histogram intersection, and outputs the each image corresponding to the color histogram as a retrieval result on the basis of the magnitude of the calculated similarity value.

Herein, when the color histogram of the query image is extracted in advance and is stored in the feature database 102, the retrieval unit 101 calculates the similarity between the color histogram of the query image extracted in advance and the color histograms of the retrieval object images, and outputs an image in accordance with the similarity as a retrieval result (There is no need to extract newly the color histogram of the query image by the color quantizer.).

On the contrary, when the query image is not stored on the feature database 102 after being extracted in advance, the color quantizer 100 extracts newly the color histogram of the query image, and provides it to the retrieval unit 101.

However, in the conventional content-based multimedia retrieval system using the color histogram, it is possible to compare the color histograms among different systems only when the same color space and same color quantization are adapted to the color quantizers.

For example, when the color histograms constructed with same color space and same quantization method are used between same two systems on the internet circumstances, it is possible to perform the multimedia data retrieval based on the colors.

On the contrary, between two different systems, when color histograms constructed with color spaces and quantization method are not same, it is impossible to perform the multimedia data retrieval based on the colors. It will now be described with reference to accompanying FIG. 2.

FIG. 2 illustrates multimedia retrieval relations between different systems in accordance with the conventional technology.

As depicted in FIG. 2, because the meaning of each bin of the color histogram is changed by different color space and different color quantization, comparing a color histogram used in a local system A 200 with a color histogram used in a local system B is impossible.

For example, when color histograms 201-1~201-N of images are stored in the feature database 201 of the local system A 200, a color histogram having 125 (5×5×5) bin number is constructed by performing 5 levels of uniform quantization about each RGB element by using a RGB (Red Green Blue) color space 202.

When color histograms 205-1~205-N of images are stored on the feature database 205, the local system B 204 constructs and stores a color histogram having 343 (7×7×7) bin number by performing 7 levels of uniform quantization about each HSV (Hue Saturation Value) element by using a HSV (Hue Saturation Value) color space 206.

Accordingly, it is impossible to compare the color histogram of the local system A with the color system of the local system B.

As described above, in the conventional technology, it is impossible to perform the multimedia data retrieval between the systems using the color histograms constructed with the different color spaces and color quantization methods each other.

In addition, in the conventional technology, it is impossible to retrieve a retrieval object image about a query image of itself in a database of the other party between the systems using the color histograms constructed with the different color spaces and color quantization methods.

In addition, in the conventional technology, it is impossible to connect the databases which store various, different, wide range of images to a retrieval unit in a network circumstances such as the internet in order to retrieve images.

SUMMARY OF THE INVENTION

Accordingly, the object of the present invention is to provide a content-based multimedia retrieval system and a method thereof which is capable of performing a multimedia data retrieval among different systems using color histograms constructed with different color spaces and different color quantization methods.

The other object of the present invention is to provide the content-based multimedia retrieval system and the method thereof which is capable of retrieving an image to be retrieved corresponding to a query image of itself in a database of the other party, when retrieving multimedia data in systems using color histograms constructed with different color spaces and color quantization methods.

The another object of the present invention is to provide the content-based multimedia retrieval system and the method thereof which is capable of retrieving images by connecting databases storing various, different, wide range of images to a retrieval unit on a network circumstances such as the internet.

The another object of the present invention is to provide the content-based multimedia retrieval system and the method thereof which is capable of increasing multimedia data retrieval speed by extracting a color histogram of a query image in advance and storing the extracted color histogram of the query image.

In order to achieve the objects of the present invention, the content-based multimedia retrieval system for retrieving content-based multimedia data comprises a first color quantization means for extracting a color histogram of query multimedia data; a second color quantization means for extracting color histograms of multimedia data to be retrieved; and a histogram conversion means for converting the color histogram of the extracted query multimedia data and the color histogram of the multimedia data to be retrieved so as to be same each other.

In order to achieve the objects of the present invention, the content-based multimedia retrieval method for retrieving multimedia data by comparing query multimedia data with multimedia data to be retrieved comprises inputting query multimedia data; converting the color histogram of the inputted query multimedia data and the color histogram of the multimedia data to be retrieved so as to be same each other; and calculating a similarity between the query multimedia data and multimedia data to be retrieved on the basis of the converted color histogram and outputting a retrieval result in accordance with the calculated similarity.

In order to achieve the objects of the present invention, the content-based multimedia retrieval method for retrieving multimedia data by comparing query multimedia data with retrieval object multimedia data comprises extracting a color histogram of the query multimedia data; extracting a color histogram of the multimedia data to be retrieved; comparing the extracted color space and color quantization method of the query image with the color space and color quantization method of the multimedia data to be retrieved; and converting the color histogram of the extracted query multimedia data or the multimedia data to be retrieved into the same color histogram so as to have same color space and color quantization method each other when the color spaces and color quantization methods of the extracted multimedia data and multimedia data to be retrieved are different each other, and performing a retrieval in accordance with the similarity between the query multimedia data and multimedia data to be retrieved.

In order to achieve the above-mentioned objects of the present invention, in the content-based multimedia retrieval system and the method thereof in accordance with the present invention, the multimedia data generation method comprises generating color space description information describing what color space the color histogram of the multimedia data is constructed; and generating quantization description information describing what color quantization method the color histogram of the multimedia data is constructed.

In order to achieve the above-mentioned objects of the present invention, the histogram conversion method of multimedia data in a content-based multimedia retrieval on the basis of the color histogram as a feature element for content-based multimedia retrieval comprises projecting each subordinate color space of the color space of the quantized query multimedia data on the color space of the multimedia data to be retrieved; and distributing a bin value to each quantum of the color space of the multimedia data to be retrieved, which is overlapped with the projected color spaces.

In order to achieve the objects of the present invention, the content-based multimedia retrieval system comprises a first color quantization means for extracting color histogram of the multimedia data to be retrieved; a description means for describing color space and color quantization method of the extracted color histogram; and a second color quantization means for extracting color histogram of a query multimedia data with a method same as the described color space and color quantization method in order to perform the multimedia data retrieval.

In order to achieve the above-mentioned objects of the present invention, in the retrieval method for retrieving the multimedia data to be retrieved with an input of the query multimedia data, the content-based multimedia retrieval method comprises judging whether the color histogram of the query multimedia data corresponding to the color space and quantization method of the multimedia data to be retrieved is stored before; and calculating a similarity between the color histogram of the stored query multimedia data and the color histogram of the multimedia data to be retrieved and performing a multimedia retrieval in accordance with the calculated similarity.

DETAILED DESCRIPTION OF THE PREFERRED EMBODIMENT

The present invention is to provide a content-based multimedia retrieval system and a method thereof which is capable of performing a multimedia data retrieval among different systems having multimedia data constructed with different color spaces and different color quantization methods (systems using color histograms constructed with different color spaces and color quantization methods).

First, a first embodiment of the content-based multimedia retrieval system in accordance with the present invention will now be described in detail with reference to accompanying FIG. 3.

Figure 1:
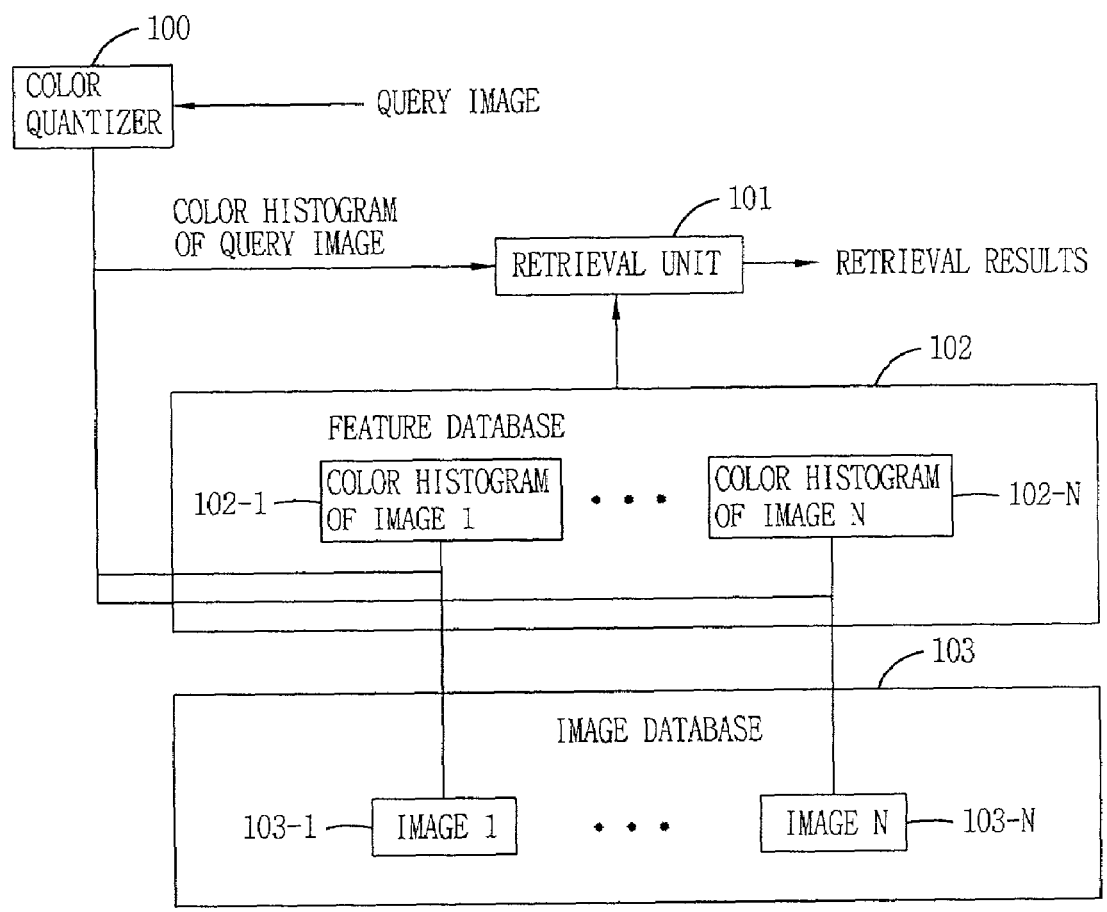
FIG. 1 illustrates a construction of a content-based multimedia retrieval system using a color histogram in accordance with the conventional technology.
Figure 2:
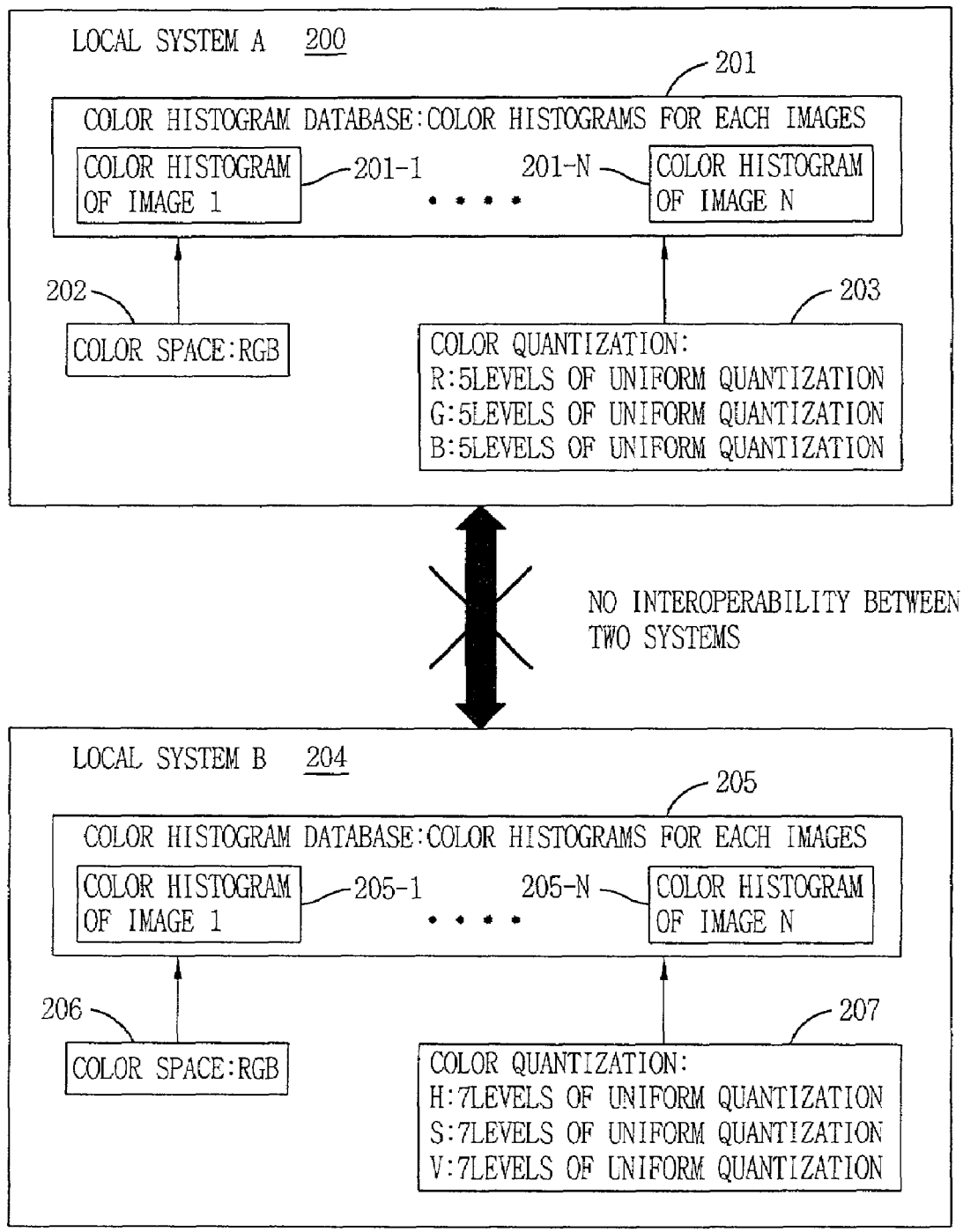
FIG. 2 illustrates multimedia retrieval relations between different systems in accordance with the conventional technology.
Figure 3:
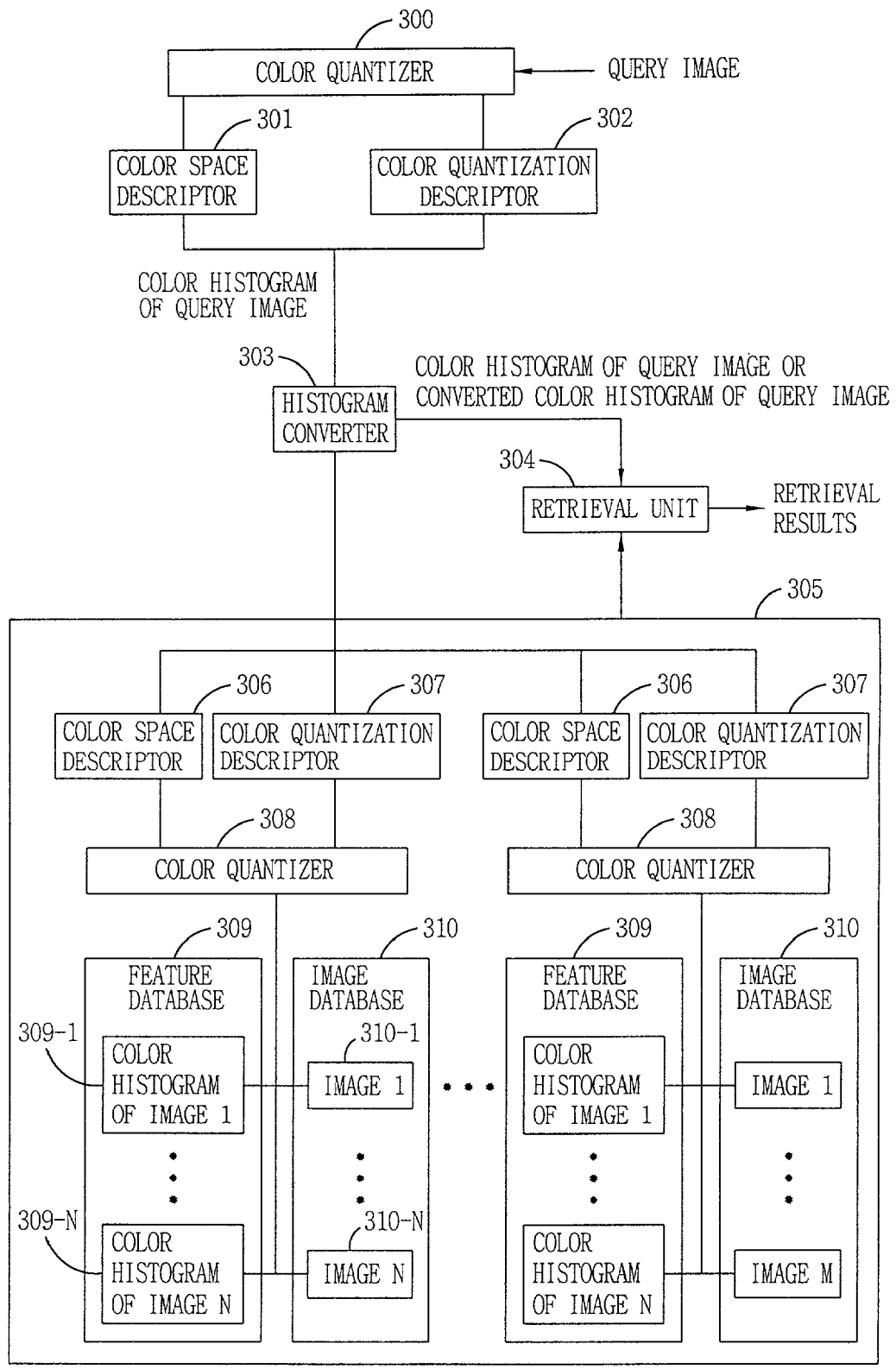
FIG. 3 illustrates a construction of a first embodiment of a content-based multimedia retrieval system in accordance with the present invention.

FIG. 3 illustrates a construction of the first embodiment of the content-based multimedia retrieval system in accordance with the present invention.

As depicted in FIG. 3, the content-based multimedia retrieval system comprises a color quantizer 300 for extracting a color histogram of a query image after being inputted the query image by a user, a color space descriptor 301 for describing color space information which is basis of the extracted color histogram of the query image, a color quantization descriptor 302 for describing the color quantization information which is basis of the extracted color histogram, a retrieval object system 305 for providing retrieval object image data 310-1~310-N and color histograms 309-1~309-N of the retrieval object images, a color histogram converter 303 for converting the color histogram of the extracted query image so as to correspond to the color histograms 309-1~309-N of the retrieval object images (multimedia data to be retrieved) in order to perform a multimedia retrieval among the different systems, and a retrieval unit 304 for calculating similarity among the color histogram of the converted query image and the color histograms 309-1~309-N of the retrieval object images and outputting an image in accordance with the similarity as a retrieval result.

The retrieval object system 305 comprises image databases 310 for storing the retrieval object images (multimedia data to be retrieved) (data image 1~image N) 310-1~310-N, color quantizers 308 for extracting the color histograms 309-1~309-N as the feature information of the retrieval object image data (Image 1~image N) 310-1~310-N, feature databases 309 for storing the extracted color histograms 309-1~309-N of the retrieval object images, color space descriptors 306 for describing the color space information which is the basis of the color histogram of the retrieval object image, and color quantization descriptors 307 for describing the color quantization information which is the basis of the color histogram of the retrieval object image.

Hereinafter, the operation of the content-based multimedia retrieval system will now be described in detail.

First, when the query image is inputted, the color quantizer 300 extracts the color histogram which is the feature information of the query image.

Herein, the color histogram of the query image extracted by the quantizer 300 is extracted as a certain color space and a certain color quantization.

The color space quantizer 301 describes the color space of the extracted color histogram, and the color quantization descriptor 302 describes the color quantization method of the extracted color histogram.

Meanwhile, the retrieval object system 305 comprises the feature databases 309 for storing the color histograms having multimedia data structure, namely, constructed with the same color spaces and same color quantization methods or different color spaces and different color quantization methods.

Herein, the feature databases 309 are placed apart from each other, and are mainly connected to a network such as the internet.

In addition, the retrieval object systems 305 to be the retrieval object (to own jointly image database or provide the image database to the retrieval unit) are systems for providing data on the internet circumstances (network), they can the same kind or different kind systems.

Herein, the same kind of systems mean systems using color histograms constructed with same color spaces and color quantization methods, and the different kind systems mean systems using color histograms constructed with different color spaces and color quantization methods.

The color quantizers 308 inside of the retrieval object system 305 extract the color histograms 309-1~309-N which are the feature information of the plurality of image data (Image 1~Image N) 310-1~310-N stored in the image database 310. In other words, the color quantizer 308 extracts the one color histogram 309-1 per the image data 310-1.

The extracted color histogram 309-1 is connected to the pertinent image 310-1, and is stored in the feature database 309.

Herein, the each feature database 309 stores the retrieval object images having the color histograms constructed with the different color spaces or different color quantization methods.

The color space descriptors 306 describe the color spaces of the color histograms of the retrieval object images stored in the each feature database 309, and the color quantization descriptors 307 describe the quantizations of the color histograms of the stored retrieval object images.

After that, the color histogram converter 303 finds out the color space and color quantization method (information) as the basis of the color histogram of the query image from the color space descriptor 301 and color quantization descriptor 302.

In addition, the color histogram converter 303 finds out the color space and color quantization method as the basis of the color histograms of the retrieval object images from the color space descriptors 306 and color quantization descriptors 307 inside of the retrieval object system 305.

After that, the color histogram converter 303 compares the color space and color quantization method (information) as the basis of the color histograms of the found retrieval object images with the color space and color quantization method (information) as the basis of the color histogram of the found query image, and converts the color histogram of the query image so as to correspond to the color histograms of the retrieval object images when they are not same in the comparing result.

In addition, the color histogram converter 303 can perform a function for converting the color histograms of the retrieval object images so as to correspond to the color histogram of the query image.

For example, whenever the color spaces and color quantization methods as the basis of the color histograms of the retrieval object images stored in the feature databases 309 are not same with the color space and color quantization method as the basis of the color histogram of the query image, the color histogram converter 303 converts the color histogram of the query image so as to correspond to the color histograms of the retrieval object images.

Herein, when the color space and color quantization method of the color histogram of the query image is same with the color spaces and color quantization methods of the color histograms of the retrieval object images (in the same kind system), the color histogram converter 303 provides the color histogram of the query image to the retrieval unit 307 as it is.

On the contrary, when the color histogram of the query image and color histograms of the retrieval object images are constructed with the different color spaces and color quantization methods each other (in the different kind system), the color histogram converter 303 converts the color histogram of the query image (color space and color quantization method which are the basis of the color histogram of the query image) into the color space and color quantization method same with the color histograms of the retrieval object images (color spaces or color quantizations method which are the basis of the color histograms of the retrieval object images), and provides the converted color histogram of the query image to the retrieval unit 304.

As described above, the color histogram converter 303 converts one color histogram between the color histogram of the query image and color histogram of the retrieval object image so as to correspond to the construction (color space and color quantization) of the other color histogram in order to compare the color histogram of the query image with the color histograms of the retrieval object images.

In other words, in retrieval of an image similar to the query image in the image database 310 storing the plurality of retrieval object images (multimedia data to be retrieved), the color histogram of the query image is compared with the color histograms 309-1~309-N of the image data stored in the feature database 309.

Herein, the color histogram converter 303 converts the color histogram of the query image and the color histogram of the retrieval object image into the same histograms in order to compare the color histogram of the query image with the color histogram of the retrieval object image.

For example, when the user retrieves an image similar to the query image among the images to be retrieved constructed with the color histograms composed of different color spaces and different color quantization methods by different systems, whenever an image similar to the query image is retrieved, the color histogram of the query image is converted into the color histogram of the same as the color histogram of the image to be retrieved. Accordingly, the color histogram of the query image and the color histogram of the image to be retrieved can be compared.

After that, the retrieval unit 304 outputs an image in accordance with the similarity as a retrieval result by comparing the color histogram of the query image or converted color histogram of the query image with the color histograms of the retrieval object images (color histograms of multimedia data to be retrieved) (calculating the similarity) on the color histogram converter 303.

As described above, the content-based multimedia retrieval system in accordance with the present invention uses the color histogram converter 303, and can perform a multimedia retrieval between the different systems.

Figure 4:
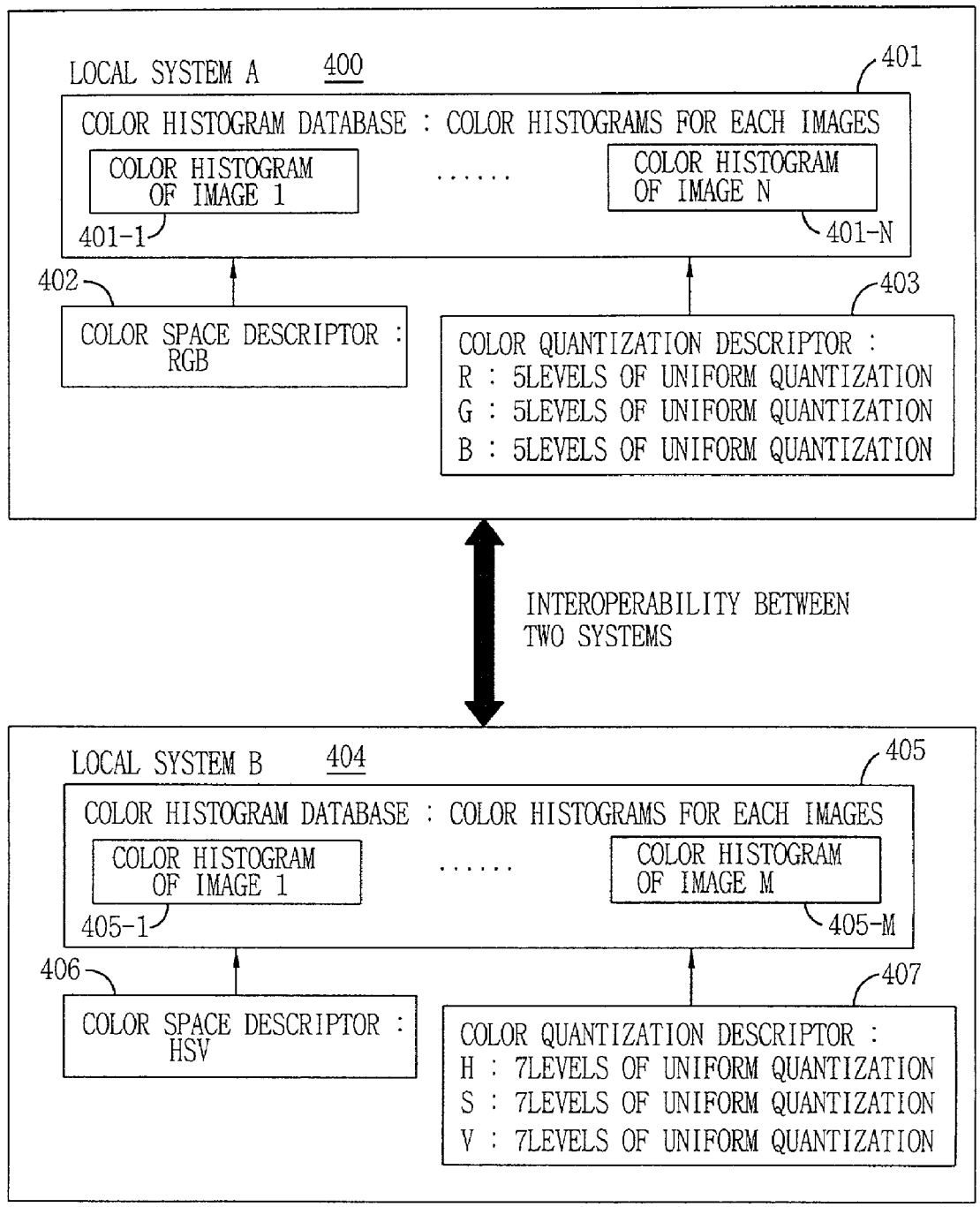
FIG. 4 illustrates multimedia retrieval relations between different systems in accordance with the present invention.

FIG. 4 illustrates a multimedia retrieval relations between different systems in accordance with the present invention.

As depicted in FIG. 4, the local system A 400 comprises feature databases 401 for storing color histograms 401-1~401-N of images, a color space descriptor 402 for describing color space information corresponding to the color histograms 401-1~401-N, and a color quantization descriptor 403 for describing color quantization information.

The local system B 404 comprises feature databases 405 for storing color histograms 405-1~405-N of images, a color space descriptor 406 for describing color space information corresponding to the color histograms 405-1~405-N, and a color quantization descriptor 407 for describing color quantization information.

Hereinafter, the multimedia retrieval between the local systems A 400 and B 404 (different systems) will now be described in detail.

First, the color space descriptor 402 inside of the local system A 400 describes the color space which is the basis of the color histogram as a RGB color space, and the color quantization descriptor 403 describes 5 levels of uniform quantization of the RGB color space.

On the contrary, the color space descriptor 406 inside of the local system B 404 describes the color space which is the basis of the color histograms as a HSV color space, and the color quantization descriptor 407 describes 7 levels of uniform quantization of the HSV color space.

Accordingly, when the comparison (retrieval) object image about the query image of the local system A is retrieved in the feature database 405 of the local system B 404, the local system A 400 can recognize the local system B 404 is different kind of system through the color space descriptors 402, 406 and color quantization descriptors 403, 407.

The local system A 400 can recognize the local system B is different kind of system, the color histogram (corresponding to the query image) based on the RGB color space (each 5 level uniform quantization) is converted into the color histogram (corresponding to the retrieval object image) based on the HSV color space (each 7 level uniform quantization), the converted color histogram is compared with the color histogram based on the HSV color space (each 7 level uniform quantization), accordingly the multimedia data retrieval is possible.

In other words, in order to compare the color histogram used in the local system A 400 with the color histogram used in the local system B 404, the one color histogram (color space and color quantization) between them is converted so as to correspond to the construction of the other color histogram (color space and color quantization), accordingly the multimedia data retrieval is possible.

In performing the above-described color histogram conversion, one quantum of the RGB color space can be projected to the HSV color space, and can be overlapped with at least one quantized subordinate space of the HSV color space. Herein, the degree of the projected color space can be found relatively and accurately by an integral calculus, however the calculation is complicate, accordingly it is not advisable in embodiment of a real-time system.

In order to solve above-mentioned problem, in the present invention, a histogram is converted quickly by using a sampling method, it will be described in detail later.

Hereinafter, when the extract method of the color histogram of the query image and the color histogram of the retrieval object image is different in accordance with the color space and color quantization, the similarity is calculated by comparing the two color histograms, it is judged whether the query image is similar to the retrieval object image in accordance with the calculated similarity, the above-described content-based multimedia retrieval method will now be described in detail with reference to accompanying FIG. 5.

Figure 5:
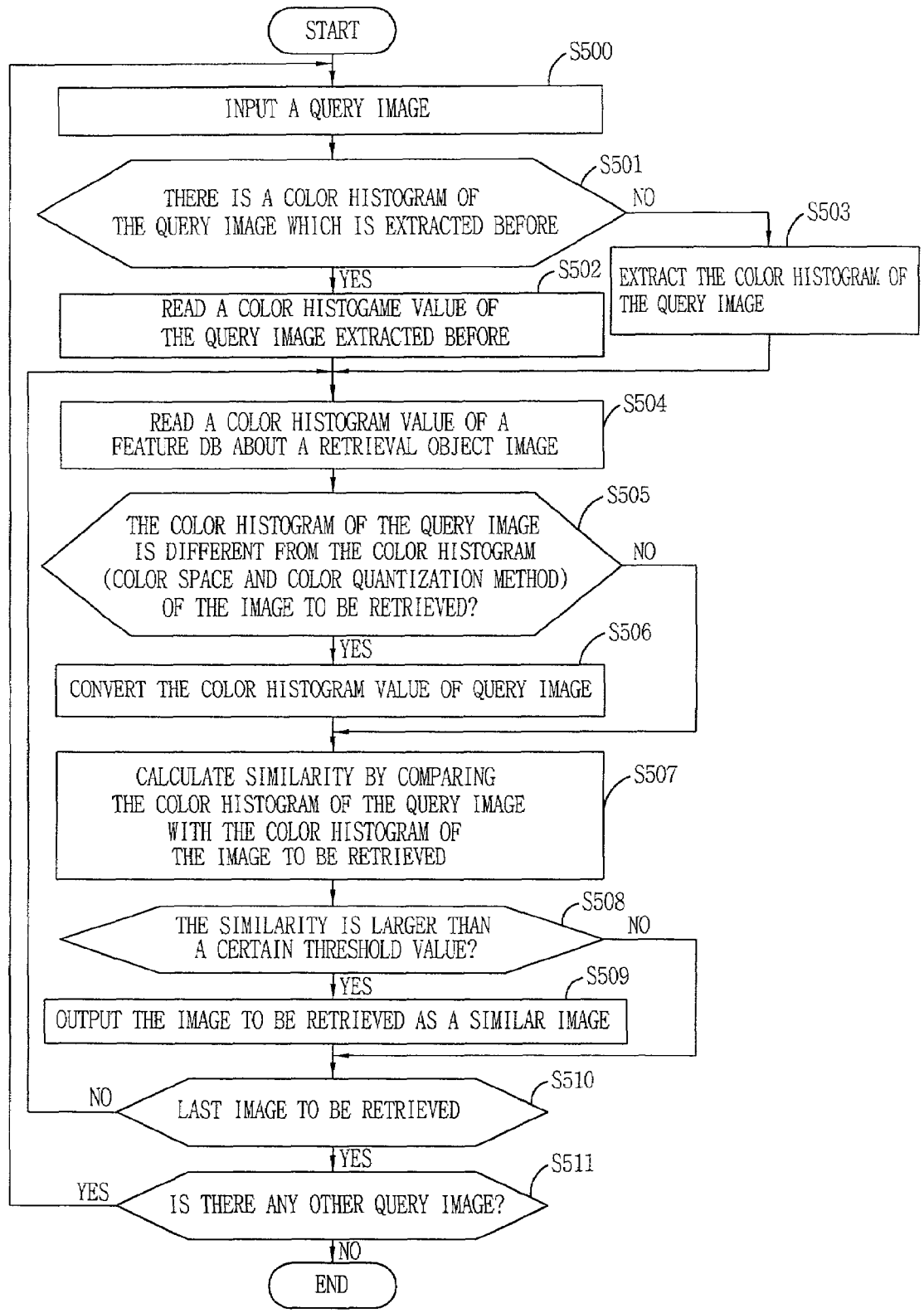
FIG. 5 is a flow chart illustrating a first embodiment of a content-based multimedia retrieval method in accordance with the present invention.

FIG. 5 is a flow chart illustrating the first embodiment of a content-based multimedia retrieval method in accordance with the present invention.

First, when the query image is inputted to the multimedia retrieval system S500, it is retrieved whether the color histogram of the query image which is same with the color histogram of the inputted query image is extracted before S501.

When there is the color histogram extracted before, the color histogram value extracted before is read from the feature database S502.

On the contrary, when the query is made newly by the user or the query image is made from the other image data and there is no color histogram extracted before, the color histogram about the query image inputted through the color quantizer 300 is extracted S503.

In the method for extracting the color histogram of the inputted query image, all pixels of the image are converted into determined color space values, the converted color space values are divided into a plurality of subordinate color spaces in accordance with the color quantization, and it is recognized which subordinate color space transforms (displays) the each converted pixel value.

After performing the process to the all pixels, it is possible to recognize how many pixels are projected to which subordinate color space. In other words, it is possible to know the values of the transformed bin number, and values found by arranging the projected bin numbers with the first dimension vector is the color histogram.

Herein, the each first vector element about the values arranged with the first vector is "Histogram Bin", and it means the subordinate color space.

Accordingly, the bin number of the color histogram coincides with the color quantization number.

After that, the color histogram is normalized regardless of the image size by dividing the first dimension vector value by a total image pixel number.

And, the color histograms values of the retrieval object images stored in the feature database are read S504.

Next, the color histogram of the query image extracted or read in the above process S502, S503 are compared with the color histograms of the all retrieval object images stored in the feature database.

In other words, the color space and color quantization method as the basis of the color histogram of the query image is compared with the color spaces and color quantization methods of the color histograms of the all retrieval object images S505.

When the color space and color quantization method as the basis of the color histogram of the query image is compared with the color spaces and color quantization methods of the color histograms of the all retrieval object images, and they are not same, the histogram converter 303 converts the color histogram of the query image so as to correspond to the color histogram of the retrieval object image.

After that, the converted color histogram of the query image is compared with the color histogram of the retrieval object image in order to calculate the similarity S507.

On the contrary, when the color space and color quantization method as the basis of the color histogram of the query image is compared with the color spaces and color quantization methods of the color histograms of the all retrieval object images and they are same, the similarity is calculated S507.

Herein, as the method for calculating the similarity, the known methods can be used.

In addition, the similarity is compared with a certain threshold value S508, and when the similarity is bigger than the certain threshold value, an image which corresponds to the color histogram of the image to be retrieved is regarded as the similar image and is outputted S509.

After that, a retrieval about the one query image is performed by performing the calculating process S507 for comparing and calculating the similarity of the color histograms of the all retrieval object images, when the color histogram of the present retrieval object image which is compared and calculated the similarity presently is not the color histogram of the last retrieval object image S510, the processes from the reading process S504 for reading the color histogram value of the retrieval object image stored in the feature database are performed repeatedly.

After that, when the calculating process for calculating the similarity is finished up to the color histogram of the last retrieval object image, it is judged whether any other query image is inputted S511, when the other query image is inputted, the processes from the query image inputting process S500 are performed repeatedly.

Meanwhile, the color histogram converting method in accordance with the present invention transforms the each subordinate space (each quantum) of the color space of the quantized query image on the color space of the retrieval object image in order to convert the color histogram, and distributes the bin value on the proportion to the overlapped volume. The above-mentioned process will now be described in detail with reference to accompanying FIG. 6.

Figure 6:
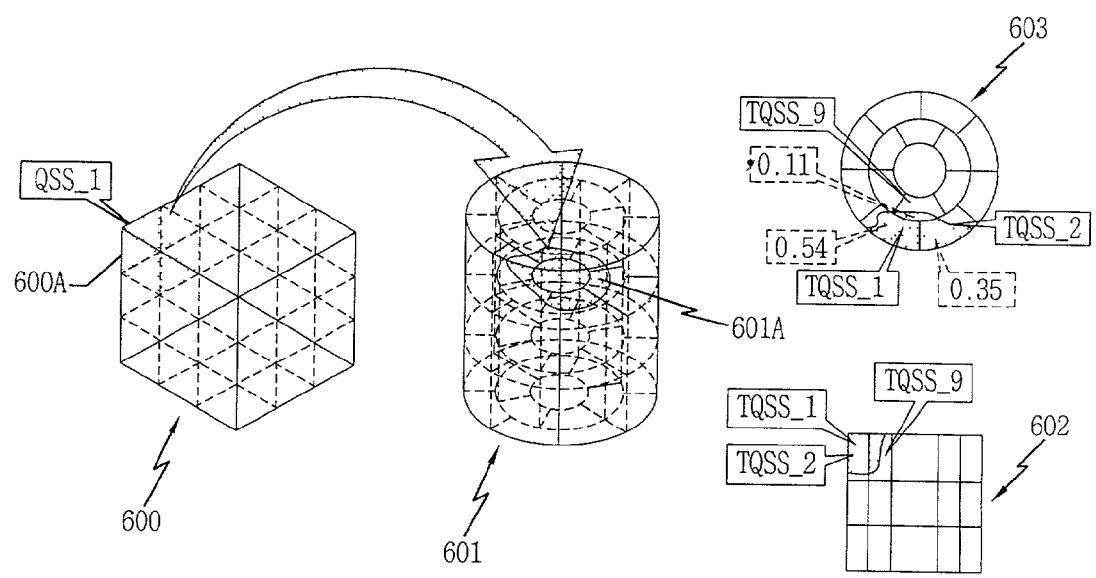
FIG. 6 illustrates a color histogram conversion method in accordance with the first embodiment of the present invention.

FIG. 6 illustrates a color histogram conversion method in accordance with the first embodiment of the present invention.

As depicted in FIG. 6, the color space of the query image is described as the RGB color space 600, the RGB color space is quantized by dividing into 3 pieces about each component (RGB). In other words, 27 numbers of quantized subordinate spaces exist in the RGB color space, and the query image is described as the color histogram having 27 bin size.

In addition, the color space of the retrieval object image is described as the HSV color space 601, it is separately divided into 3 pieces about the S and V components, the H is divided into 8 pieces or 6 pieces in accordance with region of a S value and is not divided in region adjacent to an achromatic color. In other words, there is 45 numbers of quantized subordinate spaces in the HSV color space, and the retrieval object images are described as a color histogram having 45 bin size.

One quantum in the RGB color space is projected to the HSV color space, and can be overlapped with the at least one quantized subordinate space of the HSV color space.

In addition, a quantized subordinate space QSS_1 600A of the RGB color space 600 is projected along quantized subordinate spaces TQSS_1, TQSS_2, TQSS_9 of the HSV color space 601 601A.

Herein, a reference numeral 603 is a horizontal cross section of the HSV color space 601, and a reference numeral 602 is a vertical cross section of the HSV color space 601.

Herein, when each volumetric ratio of the portion overlapped with the TQSS_1, TQSS_2, TQSS_9 by the projected quantized subordinate space QSS_1 600A is 0.54, 0.35, 0.11, a histogram value H_Q (QSS_1) of the quantized subordinate space QSS_1 (600A) is separately projected to histogram values H_T (TQSS_1), H_T (TQSS_2), H_T (TQSS_9) of the TQSS_1, TQSS_2, TQSS_9 as much as 0.54×H_Q (QSS_1), 0.35×H_Q (QSS_1), 0.11×H_Q (QSS_1), In other words, the H_T (TQSS_1), H_T (TQSS_2), H_T (TQSS_9) are renewed as below Equation 1~3.

$$H\_T(TQSS\_1) := H\_T(TQSS\_1) + H\_Q(QSS\_1) \times 0.54 \quad \text{[Equation 1]}$$

$$H\_T(TQSS\_2) := H\_T(TQSS\_2) + H\_Q(QSS\_1) \times 0.35 \quad \text{[Equation 2]}$$

$$H\_T(TQSS\_9) := H\_T(TQSS\_9) + H\_Q(QSS\_1) \times 0.11 \quad \text{[Equation 3]}$$

Herein, the H_T means a color histogram of the normalized retrieval object image, and the H_Q means a color histogram of the normalized query image.

In addition, the H_T (TQSS_k) describes a histogram value corresponding to the index TQSS_k of the H_T, and the H_Q (QSS_i) describes a histogram value corresponding to the index QSS_i of the H_Q.

When the above-mentioned process is performed about the all quantized subordinate space QSS_i of the RGB color space, the H_T (TQSS_k) values are renewed gradually, a histogram of the H_T (TQSS_k) found after the renewal is the color histogram which quantizes the HSV color space into 45 color grades (above-described quantization method) (Herein, I=1, 2, , 26, 27 and k=1, 2, , 44, 45). The above-described color histogram conversion process will now be described in detail with reference to accompanying FIG. 7.

Figure 7:
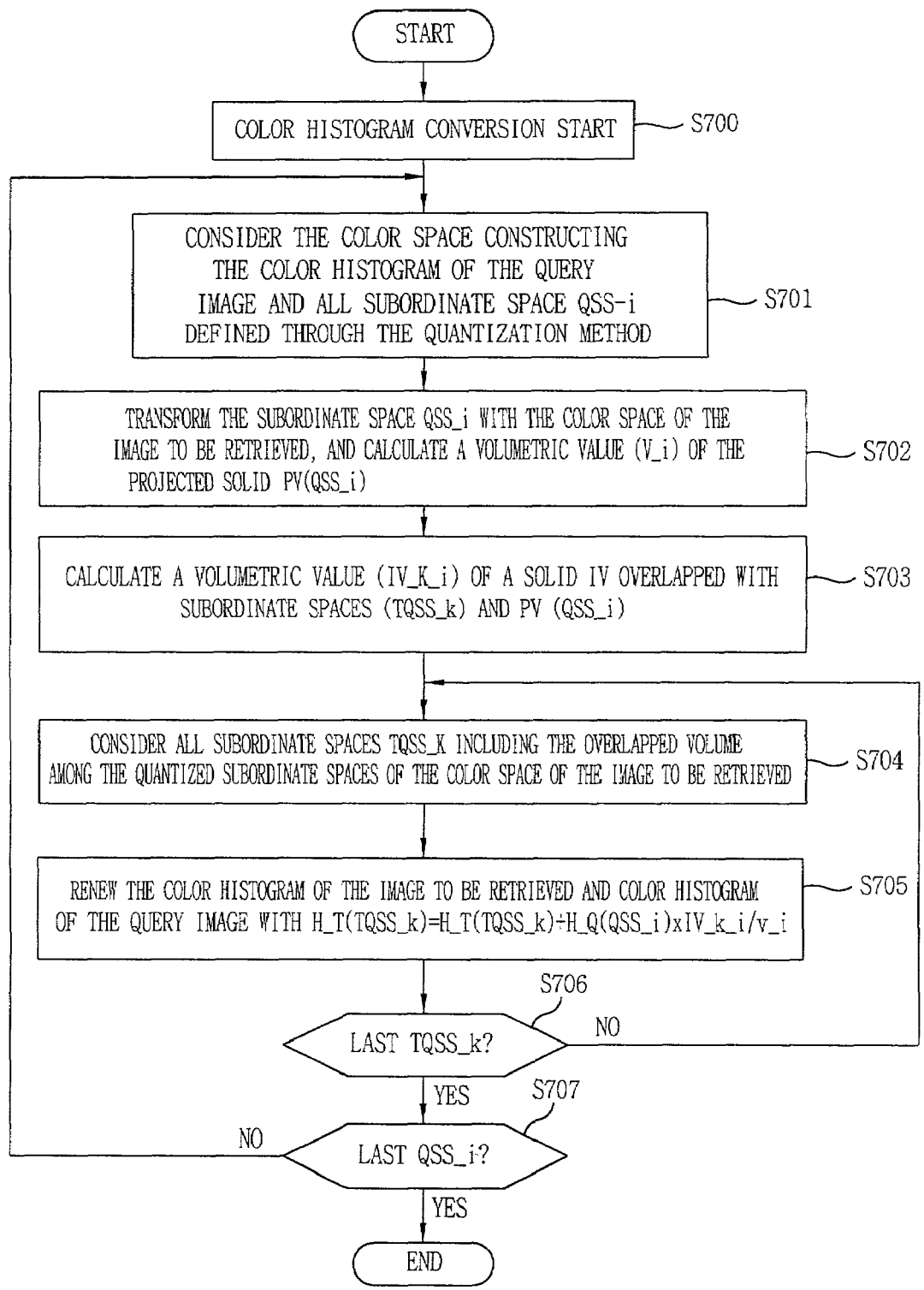
FIG. 7 is a flow chart illustrating a first embodiment of an operation process of a color histogram converter in accordance with the present invention.

FIG. 7 is a flow chart illustrating a first embodiment of an operation process of the color histogram converter in accordance with the present invention.

First, when the color spaces and quantization methods of the query image and retrieval object image are different each other, the conversion of the color histogram starts S700.

After that, the all subordinate spaces QSS_i defined through the color space and quantization method as the basis of the color histogram of the query image are considered S701.

In other words, the all subordinate spaces QSS_i are projected to the color space of the retrieval object image, and a volumetric value V_i of the projected solid PV (QSS_i) is calculated S702.

In addition, it is checked whether the all subordinate spaces QSS_i are overlapped with the subordinate spaces TQSS_k defined by the quantization method of the retrieval object image, when they are overlapped, a volumetric value IV_k_i of a solid IV overlapped with the subordinate spaces TQSS_k and the projected solid PV (QSS_i) is calculated S703.

After that, the all subordinate spaces TQSS_k including the overlapped volume among the quantized subordinate spaces of the color space of the retrieval object image are considered S704.

In the color histogram of the retrieval object image and color histogram of the query image, the all subordinate spaces TQSS_k and all subordinate spaces QSS_i are separately renewed by below Equation 4 S705, accordingly the color histogram conversion is finished $$H\_T(TQSS\_k) := H\_T(TQSS\_k) + H\_Q(QSS\_i) \times IV\_k\_i / V\_i \quad \text{[Equation 4]}$$

Herein, the IV_k_i is the volumetric value of the solid IV overlapped with the projected solid PV (QSS_I), the V_i is a volumetric value of the solid PV (QSS_i) which is projected to the color space of the retrieval object image.

After that, when the renewal process is not performed up to a subordinate space TQSS_k among the all subordinate spaces TQSS_k S706, the processes from the considering process for considering the all subordinate spaces TQSS_k S704 are performed repeatedly.

In addition, when the renewal process is not performed to the last subordinate space QSS_i among the all subordinate spaces QSS_i S707, the processes after the considering process S701 for considering the all subordinate spaces QSS-i are performed repeatedly.

Herein, a volumetric value of the projected solid can be found relatively and accurately by an integral calculus, however the calculation is complicate, accordingly it is difficult to adapt to a real-time system.

In order to solve the problem, in the present invention, the color histogram can be converted quickly by finding a volumetric value of the solid approximately by using a sampling method.

The histogram conversion method using the sampling method will now be described in detail with reference to accompanying FIG. 8.

Figure 8:
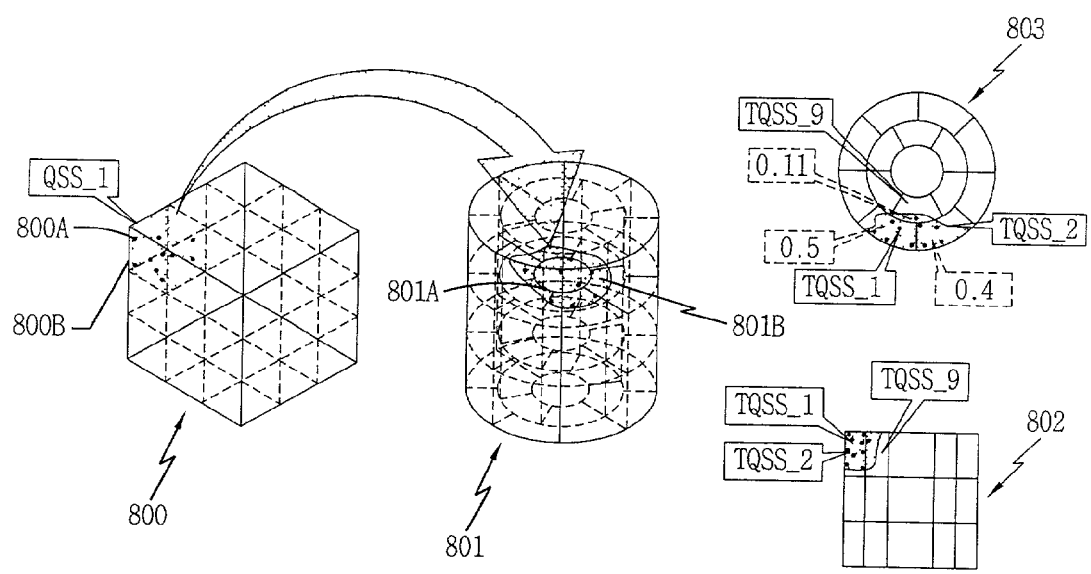
FIG. 8 illustrates a color histogram conversion method using a sampling method in accordance with the present invention.

As depicted in FIG. 8, 10 numbers of sampling points 800A are uniformly extracted from the subordinate space QSS_1 800B of the RGB color space 800.

In other words, the transformation degree is calculated by finding out in which subordinate space of the HSV color space 802 the extracted 10 numbers of sampling modes exist.

Meanwhile, a reference numeral 801A describes a total volume projected the subordinate space QSS_1 800B, and a reference numeral 801B describes the sampling points 800A are projected to the HSV color space.

In addition, a reference numeral 803 describes a horizontal cross section of the HSV color space 801, and a reference numeral 802 describes a vertical cross section of the HSV color space 801.

Whenever the each sampling point 800A is projected to the HSV color space 801, it is projected to the pertinent subordinate space as much as 0.1×H_Q (QSS_1), when it is performed to the all 10 sampling points 800A, 5 sampling points are projected to the TQSS_1 as much as 0.5×H_Q (QSS_1), it is projected to the TQSS_2 as much as 0.4×H_Q (QSS_1), and it is projected to the TQSS_9 as much as 0.1×H_Q (QSS_1).

In other words, the H_T (TQSS_1), H_T (TQSS_2), H_T (TQSS_9) are renewed as below Equation 5~7.

$$H\_T(TQSS\_1):=H\_T(TQSS\_1)+H\_Q(QSS\_1)\times 0.5 \quad \text{[Equation 5]}$$

$$H\_T(TQSS\_2):=H\_T(TQSS\_2)+H\_Q(QSS\_1)\times 0.4 \quad \text{[Equation 6]}$$

$$H\_T(TQSS\_9):=H\_T(TQSS\_9)+H\_Q(QSS\_1)\times 0.1 \quad \text{[Equation 7]}$$

Herein, the H_T is the color histogram of the normalized retrieval object image, and the H_Q is the color histogram of the normalized query image.

In addition, the H_T (TQSS_k) is the histogram value corresponding to the index TQSS_k of the H_T, and the H_Q (QSS_i) is the histogram value corresponding to the index QSS_i of the H_Q.

When the above-mentioned processes are performed to the all quantized subordinate space QSS_i of the RGB color space, the H_T (TQSS_k) values are renewed gradually, the histogram of the H_T (TQSS_k) found after the renewal is the color histogram which quantizes the HSV color space into 45 color grades (above-described quantization method) (Herein, i=1, 2, , 26, 27 and k=1, 2, , 44, 45).

In the present invention, in sampling of the quantized subordinate space of the color space of the query image, the number of the sampling point can be different in accordance with importance of the each subordinate space.

In other words, by differentiating the number of the sampling point in accordance with importance of the each subordinate space, the present invention can improve the accuracy in conversion of the histogram, and at the same time can decrease the histogram conversion time.

Herein, the importance of the subordinate space is the bin value of the histogram corresponding to the subordinate space and the volumetric value of the subordinate space.

First, in sampling of the subordinate space, the pertinent bin value is inputted from the color histogram, when the bin value is big, lots numbers of the sampling points are made, when the bin value is small, fewer numbers of the sampling points are made.

Because the subordinate space having 0 histogram bin value do not contribute to the histogram conversion, there is no need to perform the sampling, in particular, in the histogram of the minutely quantized color space there is pretty many beans having 0 bin value, accordingly it is possible to decrease the histogram conversion time.

In the bin value excluding 0, the reflection degree of the volumetric value of the quantized subordinate space of the color space of the query image is adjusted in proportion to the bin value.

In other words, as larger as the volume of the quantized subordinate space of the color space of the query image, lots of the sampling points are needed in order to cover the space, in sampling of the quantized subordinate space of the color space of the query image, the number of the sampling points is determined in consideration of the volumetric value of the subordinate space and bin value at the same time.

However, when the importance of the subordinate space is determined in order to determine the number of the sampling points, the present invention has no limit for a method considering the volumetric value and bin value.

The overall histogram conversion process including the determining process for determining the number of the sampling points of the quantized subordinate space of the color space of the query image in accordance with the importance of the volumetric value and bin value will now be described in detail with reference to accompanying FIG. 9.

Figure 9:
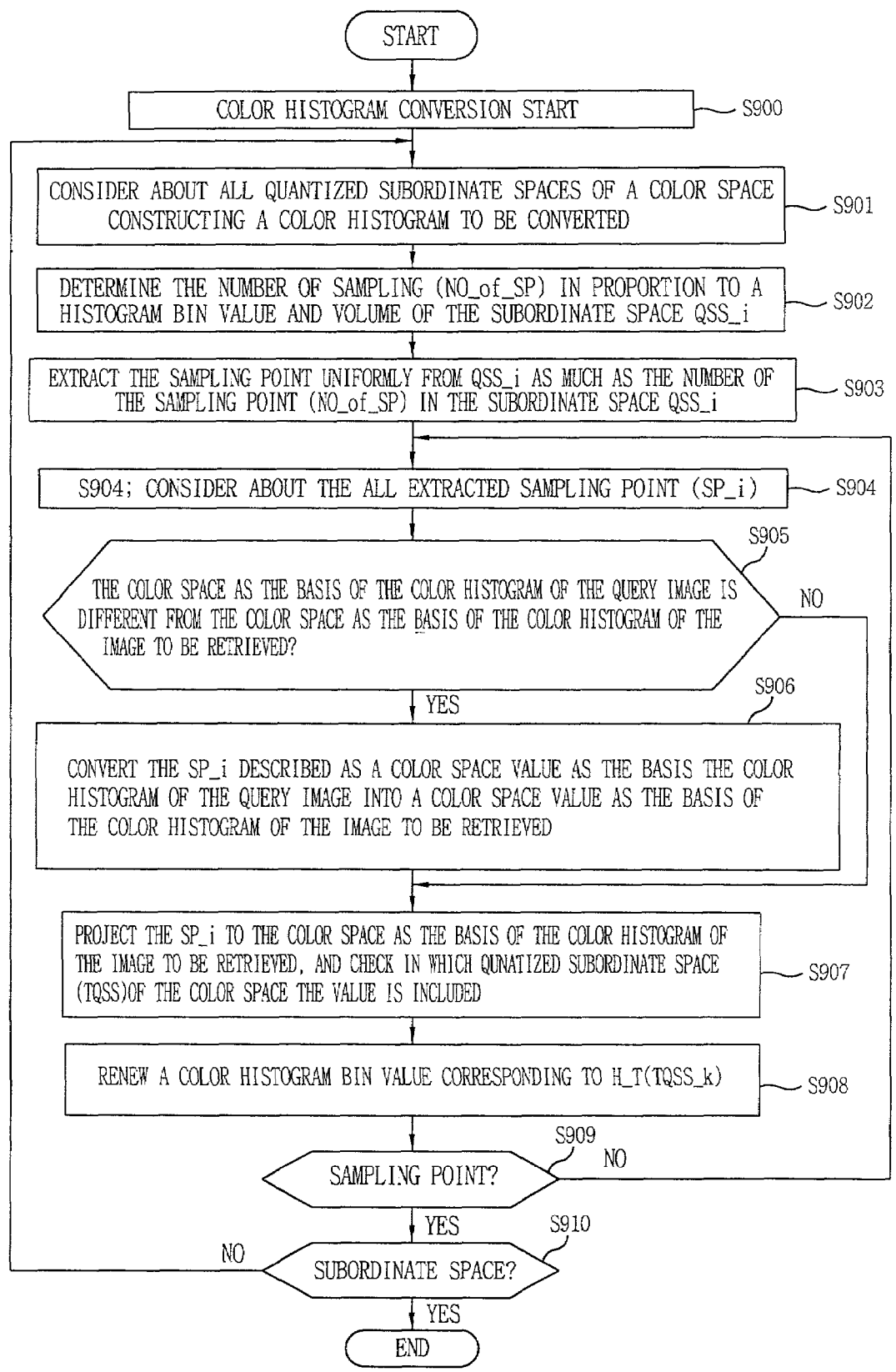
FIG. 9 is a flow chart illustrating a second embodiment of an operation process of the color histogram converter in accordance with the present invention.

FIG. 9 is a flow chart illustrating a second embodiment of an operation process of the color histogram converter in accordance with the present invention.

First, when the color spaces and quantization methods of the query image and retrieval object image are different each other, the conversion of the color histogram starts S900.

In order to convert the color histogram, the all quantized subordinate spaces of the color histogram to be converted are considered S901.

In other words, the number of the sampling point (No_of_SP) about the quantized subordinate space QSS_i of the color space of the query image is determined in proportion to the histogram bin value and volumetric value of the subordinate space QSS_i S902, and the sampling points are evenly extracted as same as the determined number from the subordinate space QSS_i S903.

Herein, the each sampling point is described as a point value of the applied color space (RGB or HSV).

In other words, when the RGB color space is applied, the sampling point is described as R=150, G=130, B=120.

In addition, after considering the extracted all sampling points (SP_i), it is compared whether the color space as the basis of the color histogram of the query image (namely, the color space for extracting the sampling point) and the color space as the basis of the color histogram of the retrieval object image (the color space about the color histogram to be converted) are same S905.

When the color space as the basis of the color histogram of the query image and the color space as the basis of the color histogram of the retrieval object image do not correspond, the color value of each sampling point SP_i of the all extracted sampling points is converted into the color space value of the retrieval object image S906.

On the contrary, when the color space as the basis of the color histogram of the query image and the color space as the basis of the color histogram of the retrieval object image correspond, because only the color quantization method is different, the conversion process S906 for converting the color value into the color space value of the retrieval object image is abridged.

After that, the extracted all sampling points SP_i are projected to the color space of the retrieval object image, it is checked in which quantized subordinate space TQSS of the color space of the retrieval object image the projected value is included S907, and the color histogram bin value corresponding to the H_T (TQSS_k) is renewed as below Equation 8 S908.

$$H\_T(TQSS\_k):=H\_T(TQSS\_k)+H\_G(QSS\_i)\times 1/\text{No\_of\_}SP \quad \text{[Equation 8]}$$

Herein, the H_T means the color histogram of the normalized retrieval object image, and the H_Q means the color histogram of the normalized query image.

In addition, the H_T (TQSS_k) means the histogram value corresponding to the index TQSS_k of the H_T, and the H_Q (QSS_i) means the histogram value corresponding to the index QSS_i of the H_Q.

After that, when the sampling point SP_i which does not perform the renewal process S908 remains S909, the processes from the considering process S904 for considering the extracted all sampling points SP_i are performed repeatedly.

After that, when the quantized subordinate space QSS_i which does not perform the renewal process S908 remains S910, the processes from the considering process S901 for considering the all quantized subordinate spaces are performed repeatedly.

Accordingly, the color histogram can be converted by performing the above-described processes about the extracted all sampling points SP_i and all quantized subordinate spaces QSS_i.

In an image retrieval, the color histogram conversion method using the above-described sampling method can convert the color histogram into the different color space and different quantization, and it is adaptable when there is need to convert the histogram having the different quantization method into the other quantization method about elements constructing not only the color but also a certain at least first dimension space.

Hereinafter, the other embodiment of the content-based multimedia retrieval system and method thereof will now be described in detail with reference to accompanying FIG. 10~12.

Figure 10:
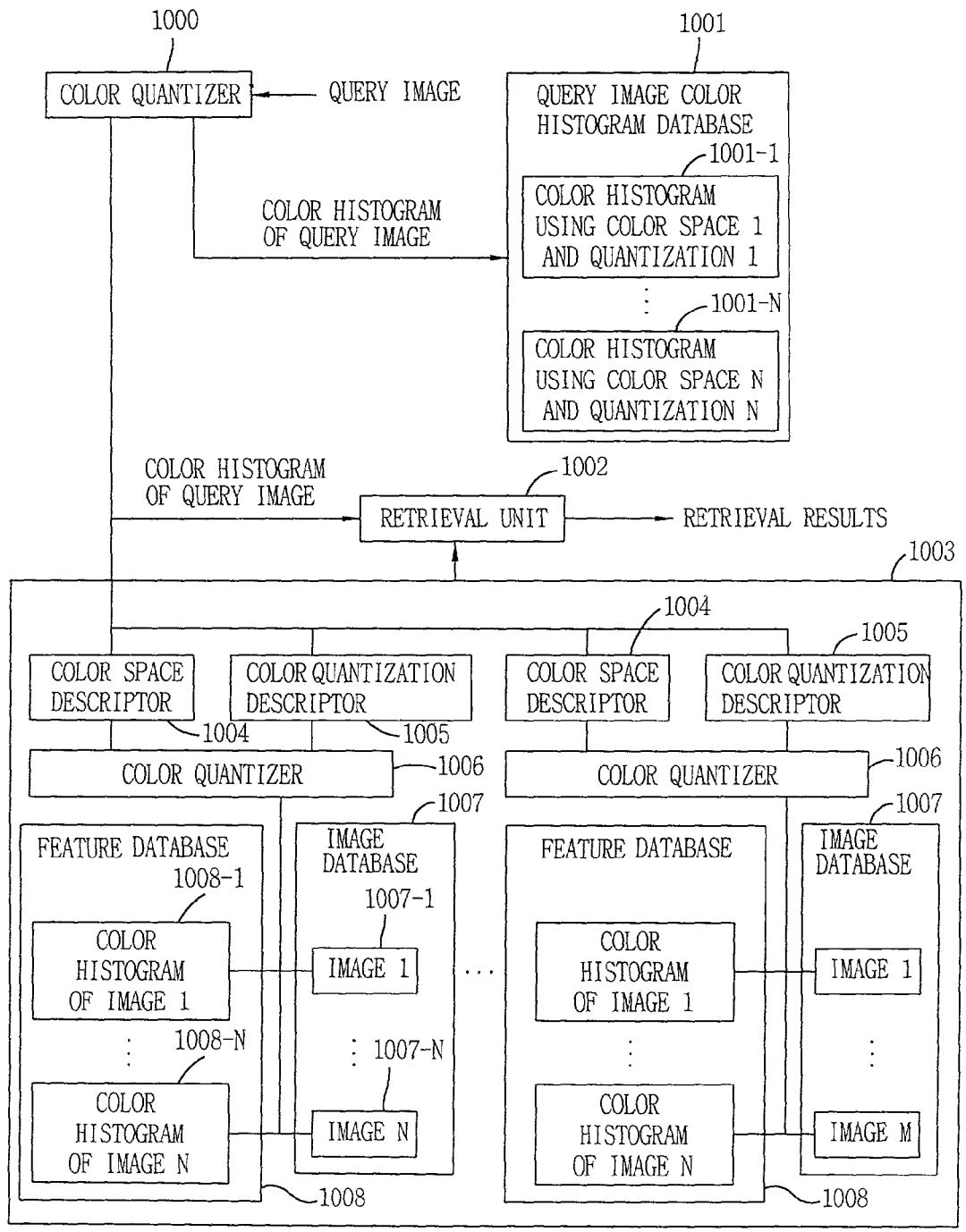
FIG. 10 illustrates a second embodiment of the content-based multimedia retrieval system in accordance with the present invention.

FIG. 10 illustrates a second embodiment of the content-based multimedia retrieval system in accordance with the present invention. In other words, the color histogram converter 303 is not comprised in the second embodiment of the content-based multimedia retrieval system, and a color histogram database 1001 of the query image is comprised.

As described above, the content-based multimedia retrieval system comprises a color quantizer 1000 for extracting the color histogram of the query image by being inputted the query image from the user, a color histogram database 1001 of the query image for storing the extracted color histogram, a retrieval object system 1003 (same as the 305 of FIG. 3) for providing the retrieval object image data 1007-1~1007-N and the color histograms 1008-1~1008-N of the retrieval object images, and a retrieval unit 1002 for calculating the similarity between the color histogram of the stored query image and color histogram of the retrieval object image and outputting an image according to the similarity as a retrieval result when the color histogram of the query image same with the inputted query image is quantized and extracted with the color space and quantization method corresponding to the color histogram construction of the retrieval object image, and is stored on the color histogram database 100 of the query image. The operation of the content-based multimedia retrieval system will now be described in detail.

First, when the query image is inputted, the color quantizer 1000 extracts the color histogram as the feature information of the query image, and stores the extracted color histogram on the color histogram database 1001 of the query image.

Herein, the color quantizer 1000 references the color space and quantization method as the basis of the retrieval object image from the retrieval object system 10037 and quantizes the color space and quantization method as the basis of the color histogram of the extracted query image so as to correspond to the color space and quantization method of the retrieval object image.

Accordingly, although the query image is same, the color histograms 1001-1~1001-N constructed with the different color spaces and quantization methods can be stored in the color histograms 1001-1~1001-N.

Meanwhile, the present invention can extract the color histogram more quickly by adapting a method for finding the color histogram by reducing the size of the query image as a thumbnail image form.

In addition, the quantization of the query image is performed in the retrieval object system 1003, and it is also possible to compare and retrieval of the quantization result (color histogram information).

Herein, the retrieval object system 1003 to be the retrieval object (owning jointly the image database or providing the image database to the retrieval unit) is a system providing data on the internet circumstances (network), it can be same kind or different kind system.

The color quantizers 1006 inside of the retrieval object system 1003 extracts color histograms 1008-1~1008-N as the feature information of a plurality of image data (Image 1 ... Image N) 1007-1~1007-N stored in the image database 1007. In other words, they extracts the one color histogram 1008-1 per the one image 1007.

Herein, the extracted color histograms 1008-1~1008-N are connected to the pertinent images 1007-1~1007-N, and are stored in the feature database 1008.

In addition, the retrieval object system 1003 comprises a color quantizer 1006 for extracting the color histogram of the retrieval object image, color space descriptors 1004 for describing the color space information as the basis of the color histogram stored in the feature database 1008 after being extracted by the color quantizer 1006, and color quantization descriptors 1005 for describing the color quantization information as the basis of the stored color histogram.

In addition, the retrieval object system 1003 is constructed with the plurality of feature databases 1008, images having color histograms constructed with different color spaces and different color quantizations are stored in the each feature database 1008, the color space and quantization of the color histogram can be described by color space quantizers 1004 and color quantization descriptors 1005.

Herein, the each feature database 1008 is placed apart from each other, and is connected with a network such as the internet.

After that, the retrieval unit 1002 judges whether the color histogram of the query image same with the query image inputted by the user is quantized by the color space and quantization method corresponding to the color histogram construction of the retrieval object image, is extracted, and is stored in the color histogram database 1001 of the query image.

In the judging process, when the color histogram of the query image same with the query image inputted by the user is stored in the color histogram database 1001 of the query image, the retrieval unit 1002 calculates similarity between the color histogram of the stored query image and color histogram of the retrieval object image, and outputs an image in accordance with the similarity as a retrieval result.

On the contrary, when the color histogram of the query image same with the query image inputted by the user is not stored in the color histogram database 1001 of the query image, the retrieval unit 1002 extracts the color histogram of the inputted query image, calculates similarity between the color histogram of the stored query image and color histogram of the retrieval object image, and outputs an image in accordance with the similarity as a retrieval result.

Herein, the color histogram of the extracted query image is stored in the color histogram database 1001 of the query image.

Hereinafter, the second embodiment of the content-based multimedia retrieval method performed by the content-based multimedia retrieval system of FIG. 10 will now be described in detail with reference to accompanying FIG. 11.

Figure 11:
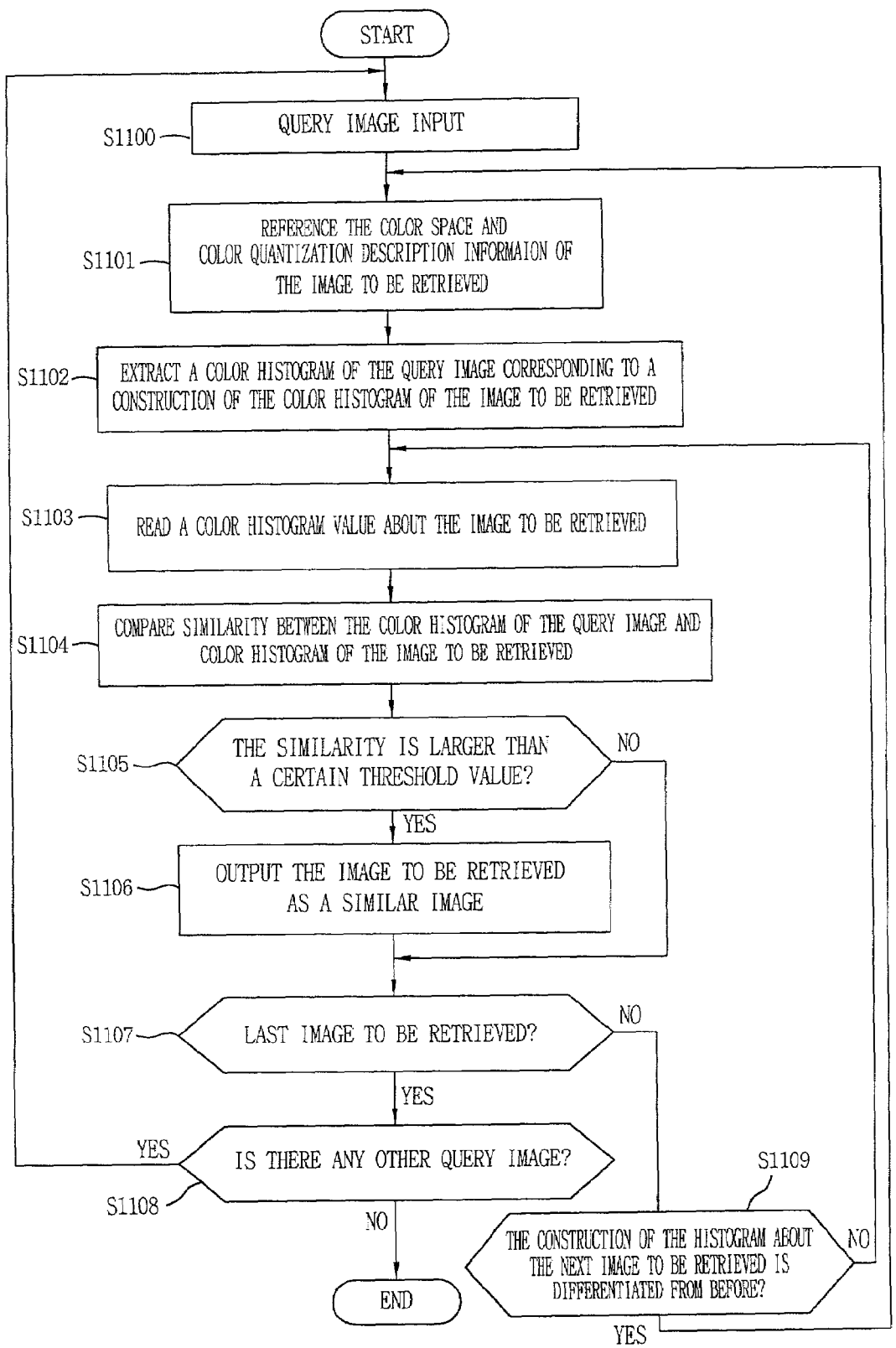
FIG. 11 is a flow chart illustrating a second embodiment of the content-based multimedia retrieval method in accordance with the present invention.

FIG. 11 is a flow chart illustrating the second embodiment of the content-based multimedia retrieval method in accordance with the present invention.

First, when the query image is inputted S1100, the quantizer 1000 (or retrieval unit 1002) acquires the color space description information and quantization description information of the retrieval object image S1101.

After that, the quantizer 1000 (or retrieval unit 1002) extracts the color histogram of the query image by quantizing the color histogram of the query image as the color space and quantization method corresponding to the color histogram construction of the retrieval object image by referencing the color space description information and quantization description information S1102.

After that, the color histogram values 1008-1~1008-N of the retrieval object images stored in the feature database 1008 are read S1103, the similarity between the extracted color histogram of the query image and color histogram of the read retrieval object image are compared S1104.

When the similarity of the color histogram of the query image and color histogram of the retrieval object image is larger than a certain threshold value S1105, the retrieval object image is outputted as a similar image S1106.

On the contrary, when the similarity of the color histogram of the query image and color histogram of the retrieval object image is smaller than a certain threshold value, the outputting process S1106 for outputting the retrieval object image (multimedia data to be retrieved) as the similar image is abridged.

After that, in the similarity comparing process, it is judged whether the comparing process is performed up to the last retrieval object image (Image N) S1107.

When the comparing process for comparing the similarity to the last retrieval object image (Image N) is not finished, it is judged whether the histogram construction about the next retrieval object image inside of the retrieval object system 1003 is differentiated from former S1109.

When the histogram construction about the next retrieval object image is differentiated from the former, and the processes from the acquiring process S1101 for acquiring the color space description information and quantization description information of the retrieval object image are performed repeatedly.

On the contrary, when the histogram construction about the next retrieval object image is same with the former, the processes from the reading process S1103 for reading the color histogram values 1008-1~1008-N about the retrieval object image are performed repeatedly.

Meanwhile, when the process for comparing the similarity is performed up to the last retrieval object image (Image N), it is judged whether the other query image is inputted S1108.

When the other query image is inputted, the processes from the inputting process S1100 for inputting the query image are performed repeatedly, when the other query image is not inputted, the multimedia data retrieval is finished.

Hereinafter, a third embodiment of the content-based multimedia data retrieval method performed by the system of FIG. 10 will now be described in detail with reference to accompanying FIG. 12.

Figure 12:
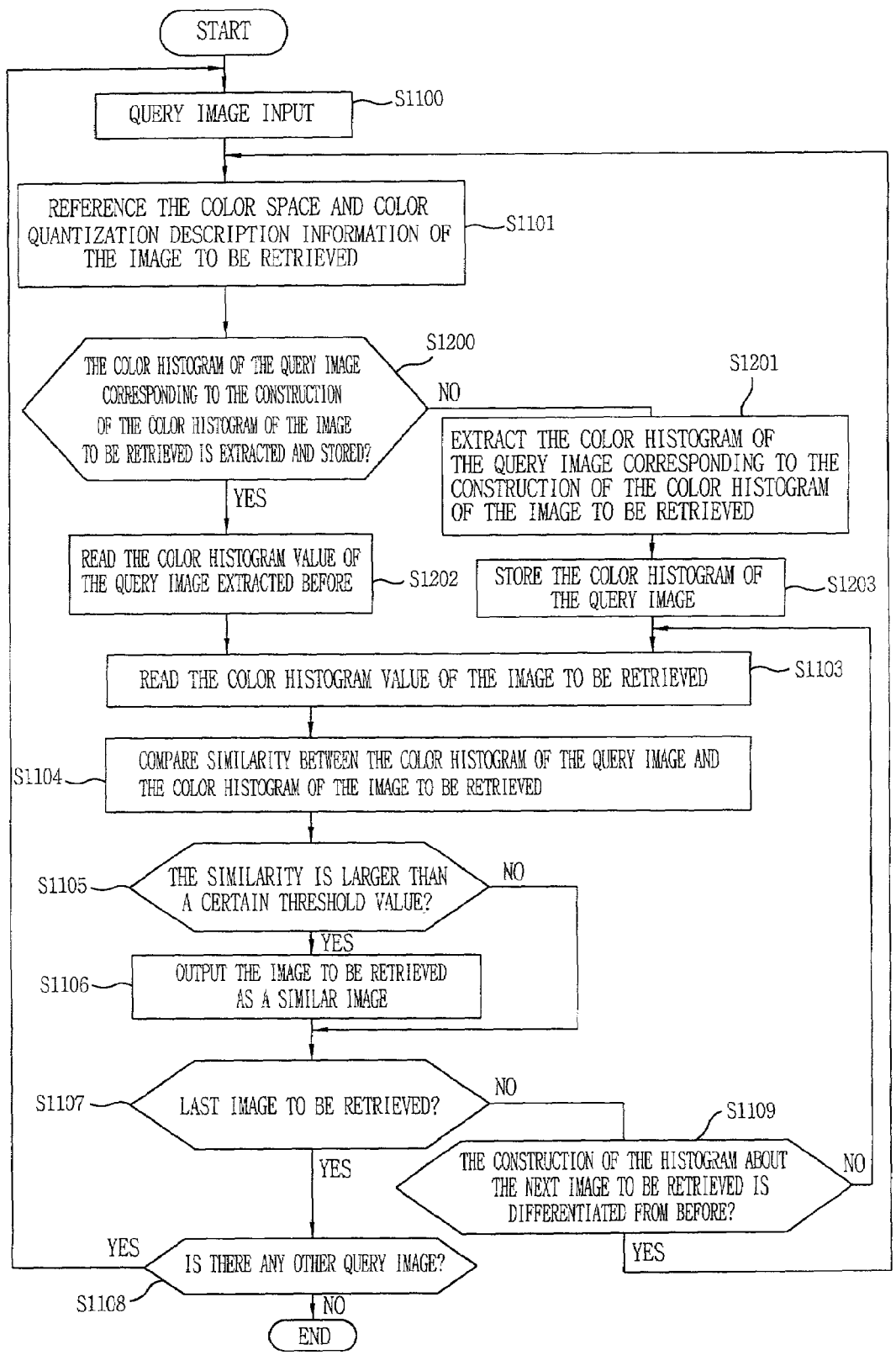
FIG. 12 is a flow chart illustrating a third embodiment of the content-based multimedia retrieval method in accordance with the present invention.

FIG. 12 is a flow chart illustrating the third embodiment of the content-based multimedia retrieval method in accordance with the present invention. The process for storing the color histogram of the query image and the process for using the stored color histogram to the multimedia retrieval are same with the second embodiment of FIG. 11. Accordingly, hereinafter, the processes S1100, S1101, S1103~S1109 same with FIG. 11 are described with same reference numerals, and overlapped descriptions are abridged.

First, when the query image is inputted S1100, by referencing the color space and color quantization description information of the retrieval object image S1101, it is judged whether the color histogram same with the inputted query image is quantized so as to correspond to the color histogram construction of the retrieval object image, is extracted, and is stored in the color histogram database 1001 of the query image S1200.

When the color histogram of the query image is extracted before and is stored in the color histogram database 1001 of the query image, the color histogram value of the stored query image is read S1202, and the processes from the reading process S1103 for reading the color histograms values 1008-1~1008-N about the retrieval object image are performed.

On the contrary, when the color histogram of the query image is not stored in the color histogram database 1001 of the query image after extracting before, the color histogram of the inputted query image is quantized with the color space and quantization method corresponding to the color histogram construction of the retrieval object image, and is extracted S1201.

After that, the color histogram of the extracted query image is stored in the color histogram database 1001 of the query image S1203, the processes from the reading process S1103 for reading the color histograms values 1008-1~1008-N about the retrieval object image are performed.

As described above, since the color histogram of the query image corresponding to the color histogram construction of the image to be retrieved is stored in advance, the present invention can skip a new process for extracting the color histogram of input query image when a query image same as the stored color histogram of the query image is inputted next time. Accordingly, the present invention can improve the multimedia retrieval speed.

As described above, the present invention is capable of performing an interoperable multimedia retrieval between different systems using the color histogram constructed with different color spaces and color quantization methods.

In addition, the present invention is capable of retrieving an image to be retrieved corresponding to the query image of itself in a database of the other party, when retrieving multimedia data in the systems using different color histogram constructed with different color spaces and color quantization methods.

In addition, the present invention is capable of retrieving images by connecting databases storing various and different and wide range of images on a network environment such as Internet.

In addition, the present invention is capable of improving the multimedia retrieval speed by extracting and storing the color histogram of the query image in advance.

What is claimed is:

1. A content-based multimedia retrieval system, comprising:
   a first color quantizer which extracts a color histogram of query multimedia data;
   a second color quantizer which extracts a color histogram of multimedia data to be retrieved; and
   a histogram converter which converts based both on color space and color quantization method the color histogram of one of the extracted query multimedia data and the multimedia data to be retrieved into a histogram having both a color space and a color quantization method of the other of the extracted query multimedia data and the multimedia data to be retrieved.

2. The content-based multimedia retrieval system according to claim 1, wherein the multimedia data are image data or video data.

3. The content-based multimedia retrieval system according to claim 1, wherein the content-based multimedia retrieval system further comprises a description means for describing color space and color quantization information, which are the bases of the color histograms, wherein the description means comprises:
   a color space description means for describing color space constructing the color histogram; and
   a quantization description means for describing color quantization method constructing the color histogram.

4. The content-based multimedia retrieval system according to claim 1, wherein the histogram converter converts the color histogram of the query multimedia data so as to be corresponding to color space and color quantization method of the multimedia data to be retrieved.

5. A content-based multimedia retrieval method, comprising
   inputting query multimedia data;
   converting based both on color space and color quantization method a color histogram of one of the input query multimedia data and multimedia data to be retrieved into a color histogram having both a color space and a color quantization method of the other of the input query multimedia data and the multimedia data to be retrieved so as to be the same as each other; and
   calculating a similarity between the query multimedia data and multimedia data to be retrieved on the basis of the converted color histogram and outputting a retrieval result in accordance with the calculated similarity.

6. The content-based multimedia retrieval method according to claim 5, wherein the multimedia data is image data or video data.

7. The content-based multimedia retrieval method according to claim 5, wherein the converting process for converting into the same histogram comprises:
   judging whether the color histogram of the query multimedia data has been extracted previously;
   reading the extracted color histogram value and identifying the color space and color quantization method;
   reading a color histogram value of the multimedia data to be retrieved and identifying the color space and color quantization method; and
   converting the color histograms into the color histograms of the same color space and color quantization method when the color histogram of the query multimedia data and the color histogram of the multimedia data to be retrieved are not the same.

8. The content-based multimedia retrieval method according to claim 7, wherein the content-based multimedia retrieval method further comprises extracting a color histogram of the input query multimedia data when the color histogram of the query multimedia data has not been extracted previously.

9. The content-based multimedia retrieval method according to claim 5, wherein the process for converting into the same histogram is performed by referencing the color space description information and quantization description information of the multimedia data to be retrieved and query multimedia data.

10. The content-based multimedia retrieval method according to claim 5, wherein the process for outputting the retrieval result comprises:
    comparing the calculated similarity with a certain threshold value; and
    outputting multimedia data corresponding to the color histogram of the multimedia data to be retrieved as a similar multimedia data when the similarity is larger than the certain threshold value.

11. A content-based multimedia retrieval method for retrieving multimedia data by comparing query multimedia data with multimedia data to be retrieved, comprising:
    extracting a color histogram of the query multimedia data;
    extracting a color histogram of the multimedia data to be retrieved;
    comparing the extracted color space and color quantization method of the query image with the color space and color quantization method of the multimedia data to be retrieved; and
    converting the color histogram of one of the extracted query multimedia data and the multimedia data to be retrieved into a color histogram having a same color space and color quantization method as the other of the extracted query multimedia data and the multimedia data to be retrieved, when the color spaces and color quantization methods of the extracted multimedia data and multimedia data to be retrieved are different each other, and
    performing a retrieval in accordance with a similarity between the query multimedia data and multimedia data to be retrieved.

12. The content-based multimedia retrieval method according to claim 11, wherein the content-based multimedia retrieval method further comprises a step of performing a retrieval in accordance with the similarity between the extracted query multimedia data and multimedia data to be retrieved when the color space and color quantization method of the extracted query multimedia data are same as the color space and color quantization method of the multimedia data to be retrieved.

13. The content-based multimedia retrieval method according to claim 11, wherein the converting process for converting the color histogram converts the color space and color quantization method of the query multimedia data so as to correspond to the color space and color quantization method of the multimedia data to be retrieved.

14. The content-based multimedia retrieval method according to claim 11, wherein the process for converting the color histogram converts the color space and color quantization method of the multimedia data to be retrieved so as to correspond to the color space and color quantization method of the query multimedia data.

15. A content-based multimedia retrieval method, comprising
    comparing the color spaces and color quantization methods of the query multimedia data and multimedia data to be retrieved;

converting the color histogram of the query multimedia data or color histogram of the multimedia data to be retrieved when the color space and color quantization method of the query multimedia data and the color space and color quantization method of the multimedia to be retrieved are different; and calculating a similarity between the converted or unconverted query multimedia data and multimedia data to be retrieved, and performing a retrieval in accordance with the calculated similarity.

16. The content-based multimedia retrieval method according to claim 15, wherein the color histogram converting process converts the color histogram of query multimedia data so as to correspond to the color space and color quantization method of the multimedia data to be retrieved.

17. A content-based multimedia retrieval system, comprising:
a first color quantizer which extracts a color histogram of multimedia data to be retrieved;
a color space description means for describing a color space of an extracted color histogram;
a color quantization description means for describing a color quantization method of the extracted color histogram; and
a second color quantizer which extracts a color histogram of query multimedia data having the same color space and color quantization method as the described color space and color quantization method in order to perform the multimedia data retrieval.

18. The content-based multimedia retrieval system according to claim 17, wherein the content-based multimedia retrieval system further comprises a retrieval unit for calculating a similarity between the color histogram of the query multimedia data extracted before and the color histogram of the multimedia data to be retrieved, and outputting multimedia data in accordance with the calculated similarity as a retrieval result.

19. The content-based multimedia retrieval system according to claim 18, wherein the content-based multimedia retrieval system further comprises a database for storing the color histogram of the extracted query multimedia data.

20. A content-based multimedia retrieval method, comprising:
judging based both on color space and color quantization method whether a color histogram of query multimedia data corresponding to a color space and a color quantization method of multimedia data to be retrieved is stored; and
calculating a similarity between the color histogram of the stored query multimedia data and the color histogram of the multimedia data to be retrieved and performing a multimedia retrieval in accordance with the calculated similarity.

21. The content-based multimedia retrieval method according to claim 20, wherein the content-based multimedia retrieval method further comprises:
quantizing and extracting the query multimedia data with the color space and color quantization method of the multimedia data to be retrieved when the color histogram of the query multimedia data is not stored;
storing the color histogram of the quantized and extracted query multimedia data; and
calculating a similarity between the color histogram of the extracted query multimedia data and the color histogram of the multimedia data to be retrieved and performing a multimedia retrieval in accordance with the calculated similarity.

22. A content-based multimedia retrieval system, comprising:
a first color quantizer which extracts a color histogram of query multimedia data;
a second color quantizer which extracts a color histogram of multimedia data to be retrieved; and
a histogram converter which converts the color histogram of one of the extracted query multimedia data and the multimedia data to be retrieved into a histogram having a color space and color quantization method of the other of the extracted query multimedia data and the multimedia data to be retrieved, wherein the content-based multimedia retrieval system further comprises a description means for describing color space and color quantization information, which are the bases of the color histograms, wherein the description means comprises:
a color space description means for describing color space constructing the color histogram; and
a quantization description means for describing color quantization method constructing the color histogram.

* * * * *